US009887914B2

(12) United States Patent
Bergman

(10) Patent No.: US 9,887,914 B2
(45) Date of Patent: *Feb. 6, 2018

(54) COMMUNICATION PATH SELECTION FOR CONTENT DELIVERY

(71) Applicant: Fastly, Inc., San Francisco, CA (US)

(72) Inventor: Artur Bergman, San Francisco, CA (US)

(73) Assignee: Fastly, Inc., San Francisco, CA (US)

(*) Notice: Subject to any disclaimer, the term of this patent is extended or adjusted under 35 U.S.C. 154(b) by 40 days.

This patent is subject to a terminal disclaimer.

(21) Appl. No.: 14/488,613

(22) Filed: Sep. 17, 2014

(65) Prior Publication Data

US 2015/0222535 A1 Aug. 6, 2015

Related U.S. Application Data

(60) Provisional application No. 61/935,629, filed on Feb. 4, 2014.

(51) Int. Cl.
*H04L 12/721* (2013.01)
*H04L 12/26* (2006.01)
(Continued)

(52) U.S. Cl.
CPC .......... *H04L 45/70* (2013.01); *H04L 43/0852* (2013.01); *H04L 43/16* (2013.01); *H04L 67/2842* (2013.01); *H04L 61/1511* (2013.01)

(58) Field of Classification Search
CPC ..... H04L 43/0852; H04L 43/16; H04L 45/70; H04L 61/1511; H04L 61/2007; H04L 61/2046; H04L 67/025; H04L 61/2053; H04L 61/2061; H04L 61/2076; H04L 61/209; H04L 45/00; H04L 45/02; H04L 47/70; H04L 67/1021; H04L 67/125; H04L 67/16; H04L 67/2842; H04L 45/021; H04L 45/123; H04L 45/24; H04L 45/74; H04L 61/609; H04L 63/10; H04L 65/4076; H04L 65/605; H04L 65/80; H04L 67/1095;
(Continued)

(56) References Cited

U.S. PATENT DOCUMENTS 7,937,470 B2    5/2011  Curley et al.
8,745,177 B1 *  6/2014  Kazerani ............... H04L 43/08
                                              370/389
(Continued)

FOREIGN PATENT DOCUMENTS

WO      2012167106 A1    12/2012

*Primary Examiner* — Greg C Bengzon

(57) ABSTRACT

Disclosed herein are methods, systems, and software for modifying a communication path based on latency. In one example, a method of operating a content node to alter a communication path includes identifying latency data for a plurality of end user devices communicating with the content node, and identifying that the one or more end user devices in the plurality of end user devices exceed a latency threshold based on the latency data. The method further includes, in response to identifying that the one or more end user devices in the plurality of end user devices exceed the latency threshold, modifying the communication path between the content node and the one or more end user devices by modifying a domain name system (DNS) configuration for the content node.

14 Claims, 6 Drawing Sheets

(51) Int. Cl.
*H04L 29/08* (2006.01)
*H04L 29/12* (2006.01)

(58) Field of Classification Search
CPC ..... H04L 67/1097; H04L 67/18; H04L 67/32; H04N 21/4126; H04N 21/4307; H04N 21/43637; H04N 21/44227
See application file for complete search history.

(56) References Cited

U.S. PATENT DOCUMENTS

| | | | |
|---|---|---|---|
| 8,938,526 B1* | 1/2015 | Richardson | H04L 67/1036 709/217 |
| 9,736,230 B2* | 8/2017 | Bugenhagen | H04L 67/10 |
| 2004/0249971 A1* | 12/2004 | Klinker | H04L 29/12066 709/239 |
| 2006/0187820 A1* | 8/2006 | French | H04L 29/12066 370/227 |
| 2007/0050522 A1 | 3/2007 | Grove et al. | |
| 2007/0153782 A1* | 7/2007 | Fletcher | H04J 3/1617 370/389 |
| 2008/0056207 A1* | 3/2008 | Eriksson | H04L 12/66 370/338 |
| 2009/0172192 A1* | 7/2009 | Christian | H04L 29/12132 709/242 |
| 2010/0226372 A1* | 9/2010 | Watanabe | H04L 29/12066 370/392 |
| 2011/0032833 A1* | 2/2011 | Zhang | H04L 45/70 370/252 |
| 2011/0158102 A1* | 6/2011 | Pombet | H04L 65/1069 370/238 |
| 2011/0225311 A1* | 9/2011 | Liu | H04L 45/125 709/231 |
| 2012/0054264 A1 | 3/2012 | Haugh et al. | |
| 2012/0054265 A1 | 3/2012 | Kazerani et al. | |
| 2012/0072600 A1 | 3/2012 | Richardson et al. | |
| 2012/0079115 A1* | 3/2012 | Richardson | H04L 29/12066 709/226 |
| 2012/0151042 A1* | 6/2012 | Garg | H04L 65/4084 709/224 |
| 2012/0173696 A1* | 7/2012 | Prasad | H04L 29/12066 709/223 |
| 2012/0303784 A1* | 11/2012 | Zisapel | G06F 9/505 709/223 |
| 2012/0303819 A1* | 11/2012 | Richardson | H04L 67/1097 709/226 |
| 2012/0320924 A1* | 12/2012 | Baliga | H04L 45/125 370/400 |
| 2013/0067530 A1* | 3/2013 | Spektor | H04L 61/305 726/1 |
| 2013/0080623 A1* | 3/2013 | Thireault | G06F 9/5027 709/224 |
| 2013/0145010 A1* | 6/2013 | Luna | H04W 40/248 709/223 |
| 2013/0166768 A1* | 6/2013 | Gouache | H04L 65/00 709/231 |
| 2013/0166774 A1* | 6/2013 | Pruthi | H04L 41/5025 709/240 |
| 2013/0198368 A1* | 8/2013 | Patterson | H04L 67/101 709/224 |
| 2013/0212266 A1* | 8/2013 | Lyon | H04L 41/00 709/224 |
| 2013/0222515 A1* | 8/2013 | Abuan | H04N 7/14 348/14.01 |
| 2013/0262554 A1* | 10/2013 | Chen | H04N 21/4126 709/201 |
| 2013/0268635 A1* | 10/2013 | Richardson | H04L 67/327 709/219 |
| 2014/0047109 A1* | 2/2014 | Santoro | H04L 29/12066 709/224 |
| 2014/0059198 A1* | 2/2014 | Richardson | H04L 61/1511 709/223 |
| 2014/0082681 A1* | 3/2014 | Brown | H04N 21/64723 725/98 |
| 2014/0098685 A1* | 4/2014 | Shattil | H04L 67/327 370/252 |
| 2014/0115135 A1* | 4/2014 | Allan | H04L 67/1004 709/223 |
| 2014/0143415 A1* | 5/2014 | Kazerani | H04L 43/0811 709/224 |
| 2014/0149552 A1* | 5/2014 | Carney | H04L 67/32 709/219 |
| 2014/0149578 A1* | 5/2014 | Goldman | H04L 45/02 709/224 |
| 2014/0164584 A1* | 6/2014 | Joe | H04L 12/5689 709/223 |
| 2014/0207818 A1* | 7/2014 | Jellick | H04L 41/082 707/771 |
| 2014/0280963 A1* | 9/2014 | Burbridge | H04L 61/1511 709/226 |
| 2014/0289303 A1* | 9/2014 | Tarricone | H04L 67/10 709/201 |
| 2014/0289319 A1* | 9/2014 | Richardson | H04L 67/2814 709/203 |
| 2014/0289420 A1* | 9/2014 | Tarricone | H04L 45/02 709/227 |
| 2014/0359092 A1* | 12/2014 | Middleton | G06F 9/541 709/221 |
| 2015/0046594 A1* | 2/2015 | Newton | H04L 41/50 709/226 |
| 2015/0054947 A1* | 2/2015 | Dawes | H04L 65/607 348/143 |
| 2015/0134848 A1* | 5/2015 | Mutz | G06F 15/16 709/238 |
| 2015/0382055 A1* | 12/2015 | Dua | H04L 29/06027 725/88 |
| 2016/0301592 A1* | 10/2016 | Douglis | H04L 41/5003 |

\* cited by examiner

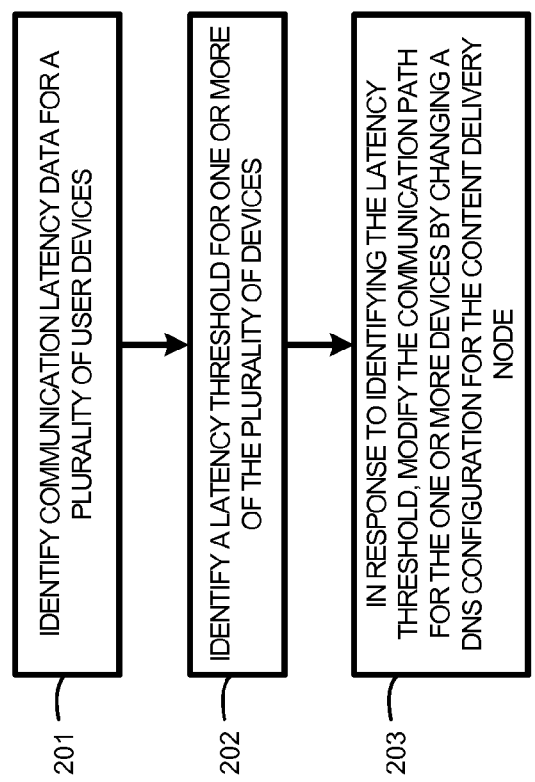

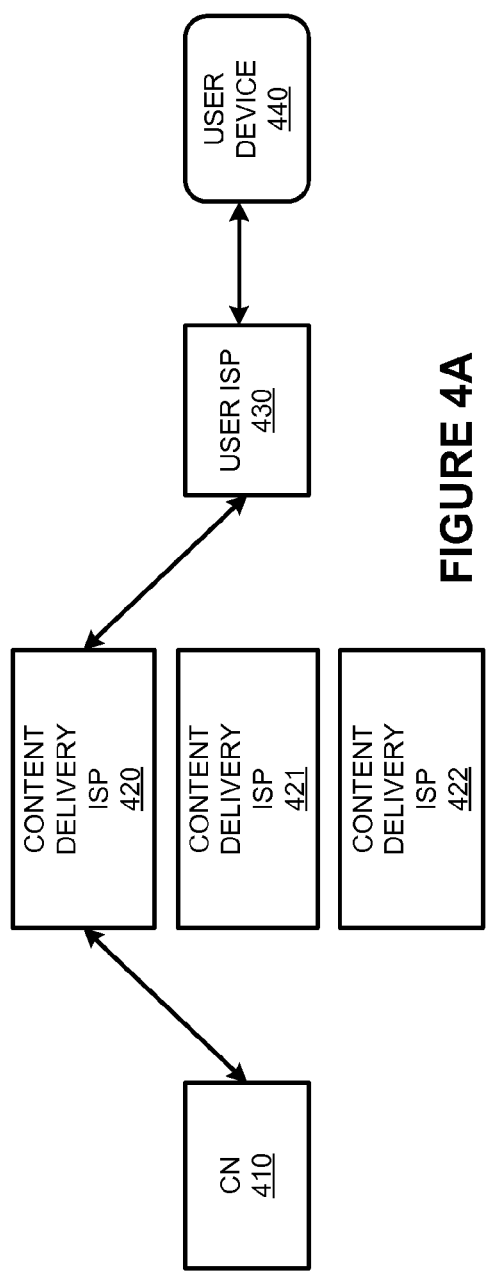
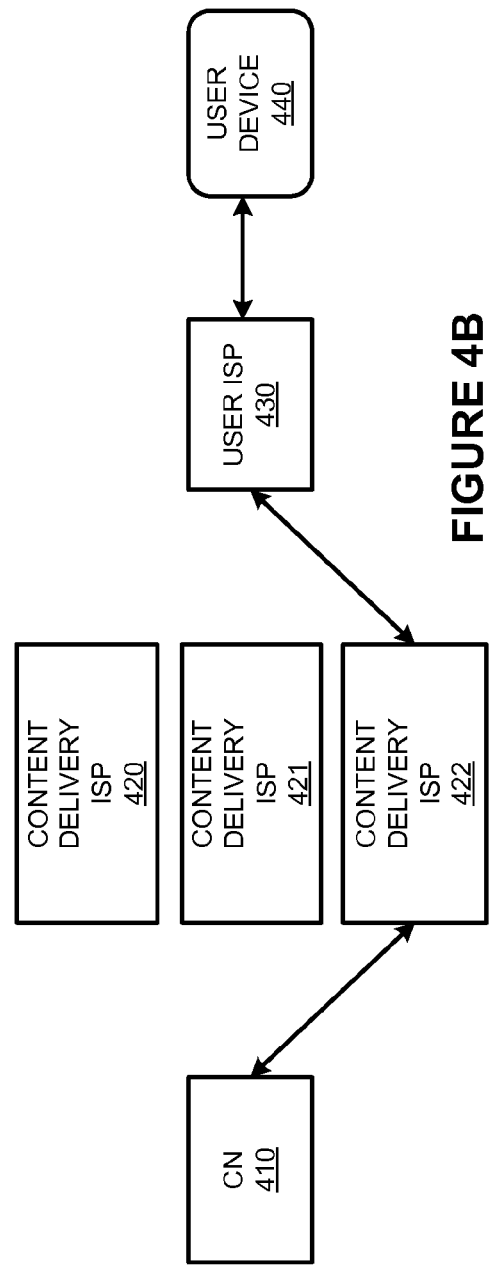

COMMUNICATION PATH SELECTION FOR CONTENT DELIVERY

RELATED APPLICATIONS

This application hereby claims the benefit of and priority to U.S. Provisional Patent Application 61/935,629, titled "LATENCY ADJUSTED COMMUNICATION PATHS," filed Feb. 4, 2014, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed that adds a layer of caching between the origin servers of the content providers and the end users. The content delivery networks typically have one or more content nodes distributed across a large geographic region to provide faster and lower latency access to the content for the end users. When end users request content, such as a web page, the content node is configured (typically through domain name systems or DNS) to respond to the end user requests instead of the origin servers. Domain name systems provide translations of domain names into IP addresses allowing a content node to act as a proxy for the origin servers.

Content of the origin servers can be cached into the content nodes, and can be requested via the content nodes from the origin servers of the content originators when the content has not yet been cached. Content nodes usually cache only a portion of the original source content rather than caching all content or data associated with an original content source. The content nodes can maintain only recently accessed and most popular content as cached from the original content sources. Thus, content nodes exchange data with the original content sources when the end users request requires new or un-cached information or if something has changed in the original content source data.

Overview

Examples disclosed herein provide methods, systems, and software for altering a communication path based on latency or delivery performance data. In one example, a method of operating a content node to alter a communication path includes identifying latency data for a plurality of end user devices communicating with the content node, and identifying that the one or more end user devices in the plurality of end user devices exceed a latency threshold based on the latency data. The method further includes, in response to identifying that the one or more end user devices in the plurality of end user devices exceed the latency threshold, modifying the communication path between the content node and the one or more end user devices by modifying a domain name system (DNS) configuration for the content node.

In another instance, a computer apparatus to operate a content node that caches content in a content delivery network includes processing instructions that direct the content node to identify latency data for a plurality of end user devices communicating with the content node. The processing instructions further direct the content node to identify that the one or more end user devices in the plurality of end user devices exceed a latency threshold based on the latency data. The processing instructions also direct the content node to, in response to identifying that the one or more end user devices in the plurality of end user devices exceed the latency threshold, modify the communication path between the content node and the one or more end user devices by modifying a DNS configuration for the content node. The computer apparatus further includes one or more non-transitory computer readable media that store the processing instructions.

In a further instance, a system to alter a communication path between one or more end user devices and a content node that caches content in a content delivery network includes a DNS configured to provide Internet Protocol (IP) addresses to a plurality of end user devices based on a DNS configuration for the content node. The system further includes the content node configured to identify content delivery performance data for a plurality of end user devices communicating with the content node, and identify that the one or more end user devices in the plurality of end user devices meet a performance condition based on the content delivery performance data. The content node is further configured to, in response to identifying that the one or more end user devices in the plurality of end user devices meet the performance condition, modify the communication path between the content node and the one or more end user devices by modifying the DNS configuration for the content node in the DNS.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 is a flow diagram illustrating the operation of a communication system.

FIG. 3 is a data structure illustrating latency between end user devices and content nodes.

FIG. 4A is an overview illustrating the operation of a communication system.

FIG. 4B is an overview illustrating the operation of a communication system.

DESCRIPTION

Figure 1:
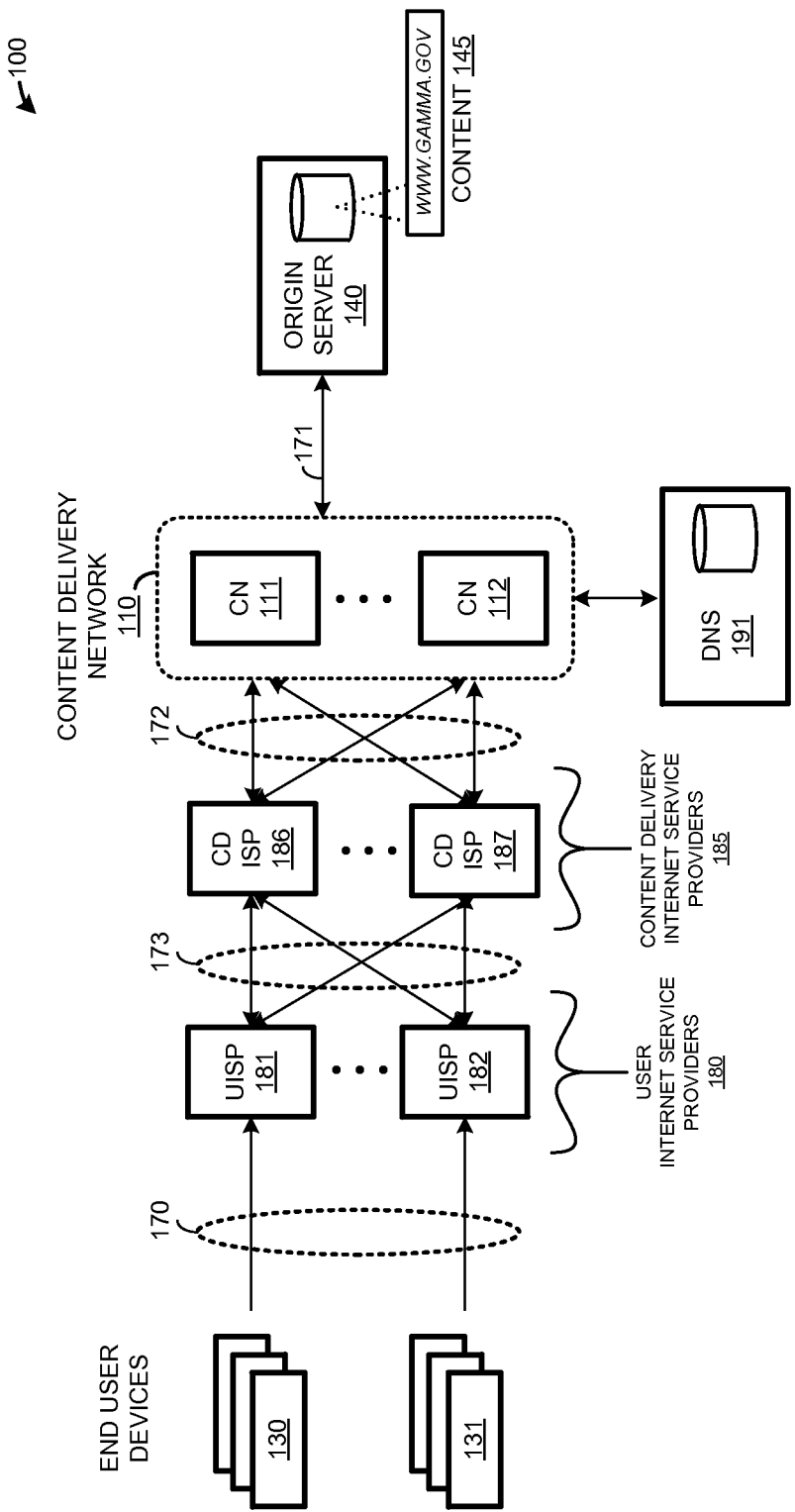
FIG. 1 is a system diagram illustrating a communication system.

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," among others. In some examples, origin servers can serve the content to end user devices. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes (CNs) distributed across a large geographic region to provide faster and lower latency local access to the content for the end users. When end users request content, such as a web page, a locally proximate CN will respond to the content request instead of the associated origin server. Various techniques can be employed to ensure the CN responds to content requests instead of the origin servers, such as associating web content of the origin servers with network addresses of the CNs instead of network addresses of the origin servers using domain name system (DNS) registration and lookup procedures. DNS registration is an Internet service that translates domain names into Internet Protocol (IP) addresses. For instance, user devices that request data from a webpage, such as www.example.com, must first request the DNS service to find the appropriate IP address that corresponds to the domain name.

In the present example, end user devices may connect to the CNs using a plurality of Internet Service Providers (ISPs) that pass the required data from one provider to the next. To accomplish this task, each CN may be connected to multiple ISPs that are each provided with a unique IP address for the node. In turn, the ISPs may be connected to other network devices and ISPs that provide data communications to the end user devices. As a result of the multiple ISPs, a user device may have options in routing the communications from the CN to the user device, and may prefer to select the path based on the latency or performance of the provided content.

In one instance, a method of adjusting communication paths for the end user devices includes identifying the content delivery ISP, the IP address for the end user device, and content delivery performance data for the content communication. The content delivery ISP is the ISP that is in direct communication with the CN, and may be identified by the unique IP address that the ISP uses to connect with the node. With these determinations, a change can be made in the path between the CN and the end user device to provide the fastest connection, such as changing the content delivery ISP between the CN and the end user device based on the content delivery performance data.

To better demonstrate the modification of communication paths, FIG. 1 is included. FIG. 1 includes content delivery network 110, end user devices 130-131, origin server 140, user internet service providers (UISP) 180, content delivery internet service providers (CDISP) 185, and DNS 191. Each of CN 111-112 can include one or more data storage systems to cache content from origin server 140. End user devices 130-131 are representative of a plurality of end user communication devices that can request and receive network content. UISPs 181-182 and end user devices 130-131 communicate over associated network links 170. Content delivery network 110 and origin server 140 communicate over associated network links 171. CDISPs 186-187 communicate with CNs 111-112 over communication links 172, and further communicate with UISPs 181-182 over communication links 173. Although illustrated in direct communication in the present example, it should be understood that one or more intermediary ISPs might exist between UISPs 180 and CDISPs 185.

In operation, end user devices 130-131 communicate with CNs 111-112 to request and receive content cached from origin server 140. To accomplish this task, DNS 191 is configured with a DNS configuration that directs content requests for content 145 to CNs 111-112. For example, a request for www.gamma.gov received by DNS 191 would direct the communication to an IP address associated with one of CNs 111-112. In the present example, the DNS configuration allows each one of CNs 111-112 to receive content from multiple IP addresses that correspond to multiple CDISPs. Accordingly, as an example, CN 111 may receive content requests from end user devices 130-131 using CDISP 186 or CDISP 187. By allowing the CNs to be contacted using multiple IP addresses and CDISPs, the CNs may adjust the communication path with the end user devices and UISPs to potentially avoid obstacles slowing performance of the communication.

Turning now to FIG. 2, FIG. 2 illustrates a method of configuring data paths for end user devices based on communication latency or performance. As described in FIG. 1, user devices may communicate with content delivery network 110 to receive various data and information from CNs 111-112. CNs 111-112 may be configured with multiple IP addresses that allow each CDISP 186-187 to address the CNs individually. For example, CDISP 186 may have a different IP address for CN 111 than CDISP 187, which allows the end user devices to address the same CN using different communication paths.

By providing multiple IP addresses for the same CN, the communication system is capable of adjusting the communication path for the user device based on the performance or latency provided for each of the paths. To accomplish this task, each CN is configured to gather performance or latency data for the plurality of devices that attempt to communicate with the CN (201). This data may include a variety of information, such as the IP address for the requesting user device, the identity of the CDISP that is making the request to the CN, the latency or time for the data request to be processed, amongst other possible performance data. Based on the data, the CN is configured to determine that one or more of the user devices have attained or exceeded a latency threshold (202). The latency threshold may be determined based on a comparison to the latency of other devices, a predefined threshold by an administrator of the system, or any other possible latency threshold. In response to the identification of the latency threshold, the CN is configured to adjust the communication path for the one or more user devices by changing the DNS configuration for the CN (203). In some examples, changing the DNS configuration comprises changing the IP address for the CN to route communications through one or more different ISPs. As a result, although the user device may be routed through the same user ISP, the user ISP may be communicating directly or indirectly with an alternative CDISP. This may allow the avoidance of any problems that may have existed between the user ISP and the first CDISP.

For example, user device 130 may be communicating with CN 111 using UISP 181 and CDISP 186. At some instance during the communication, CN 111 may identify that the communication latency between user device 130 and CN 111 exceeds a certain threshold. To address this problem, CN 111 may configure or notify DNS 191 to change the IP address associated with CN 111 to one of the IP addresses used by CDISP 187. These alternative IP addresses are still used by CN 111, but allow the communication path for the user device to change, potentially avoiding a problem within the original communication path. Accordingly, user device 130 may communicate with CN 111 using UISP 181 and CDISP 187 to avoid any communication issues between UISP 181 and CDISP 186.

Turning now to FIG. 3, FIG. 3 illustrates a data structure 300 for determining latency between a user device and CN. Data structure 300 is illustrated as a table in the present example, but it should be understood that data structure 300 might take the form of a list, tree, or any other structure capable of maintaining latency information about a plurality of user devices. Data structure 300 includes device IP address 310, content delivery ISP 312, and latency 314 that manages latency data 320.

In operation, a CN, such as CN 111, may be configured to monitor the latency of data accesses for a plurality of user devices. In doing so, the CN may be configured to determine IP addresses for the user devices, content delivery ISP identifiers, and latency data for the various communications. The content delivery ISP identifiers are used to identify the various ISPs that can communicate directly with the CN. These ISPs are provided with separate IP addresses for the node, which allows different paths between user devices and the content on the CN.

As illustrated in FIG. 3, a plurality of user devices are connecting to the CN using two separate content delivery ISPs, alpha and beta. These ISPs each connect with the CN using different IP addresses, such that the address used by alpha is not the same as the address used by beta. As the CN gathers latency data 320, or the amount of time it takes for content to be delivered to a user device, the node may determine that a threshold latency value has been attained or exceeded. This threshold latency value may be specified by an administrator of the system, may be based in comparison to the latency of other data accesses to the node, or may be based on any other threshold determination. Once the threshold value has been attained, the CN is configured to change the communication path between the user device and CN. For instance, the CN may change the path from passing through ISP alpha to passing through ISP beta. As a result, the communication latency may improve if there were any issues in the original path.

FIGS. 4A and 4B illustrate an overview of changing a communication path based on latency. The overview includes CN 410, content delivery ISPs 420-421, user ISP 430, and user device 440. As illustrated in FIG. 4A, user device 440 may initiate a communication with CN 410 using user ISP 430 and content delivery ISP 420. During this communication, CN 410 may monitor the latency for user device 440 as well as the latency for a plurality of other user devices. Based on the latency or performance information, CN 410 may identify the attainment of a latency threshold to change the communication path between the user devices and the CN. This threshold may be preset by an administrator, may be based on a comparison with other latency values, or may be determined by any other threshold measurement.

Once it is determined that the communication between user device 440 and CN 410 exceeds the threshold latency, CN 410 is configured to modify the communication path for the user device. In some examples, CN 410 may define IP groups for the user devices that are affected by the latency in the communication. These IP groups may be defined by a range of IP addresses that likely share an ISP provider, or that may be routed through the same or similar connection path in arriving at CN 410. Accordingly, CN 410 may be configured to change the communication path for all similar devices in the IP group based on the attainment of the latency threshold.

As illustrated in FIG. 4B, user device 440 is transitioned to communicating with CN 410 using content delivery ISP 422 and user ISP 430. To accomplish this task, CN 410 may be configured to change the IP address associated with CN 410 in a DNS to route communications through content delivery ISP 422 as opposed to content delivery ISP 420. This transition may be used to avoid any possible obstacles that were slowing the communication using the previous path.

In some examples, CN 410 may be configured with multiple IP addresses that are associated with each content delivery ISP. For example, content delivery ISP 420 may be configured to communicate with CN 410 using a first IP address, and content delivery ISP 422 may be configured to communicate with CN 410 using a second IP address. When a path transition occurs, such as that illustrated in FIGS. 4A and 4B, the IP address that is given to user device 440 by a DNS or other similar system may be changed to direct the user device communications through content delivery ISP 422.

Figure 5:
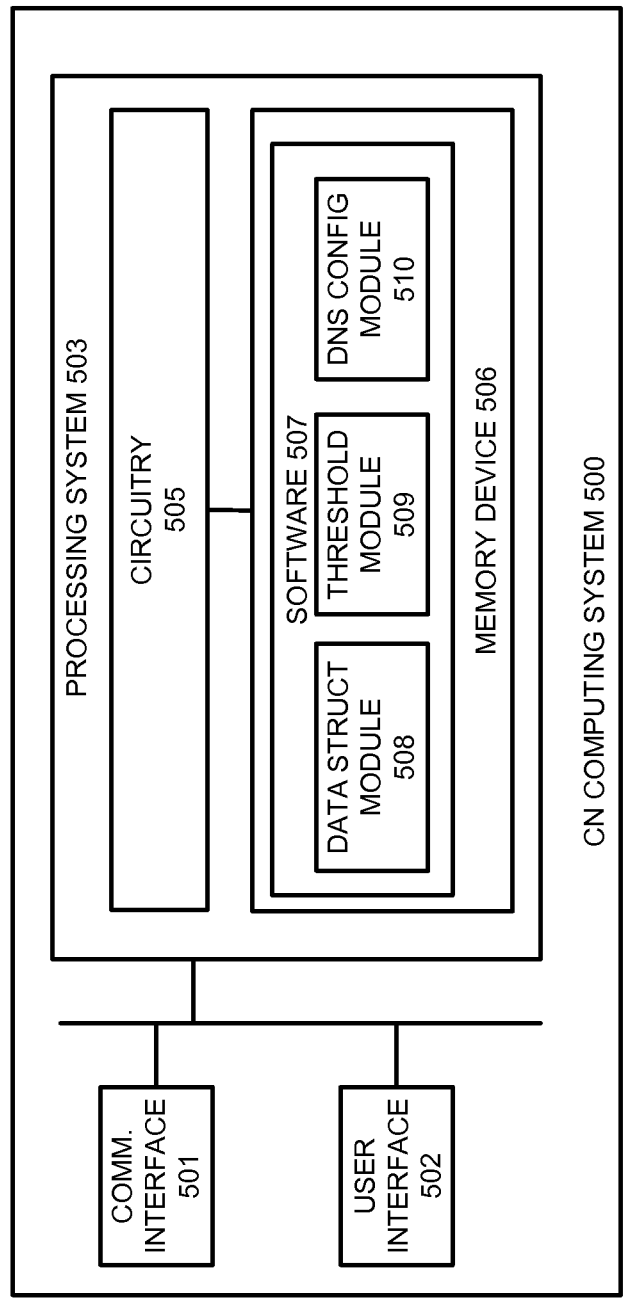
FIG. 5 is a computing system for operation in a content delivery network.

Turning now to FIG. 5, FIG. 5 illustrates a CN computing system 500 for changing communication paths based on latency data. CN computing system 500 is an example CN from FIGS. 1-4, although other CN examples may exist. CN computing system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 may communicate with end user devices over one or more ISPs, and also communicate with a DNS that provides IP addresses to the end user devices. Communication interface 501 may further communicate with one or more origin servers to cache content to be delivered to the end user devices.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes data structure module 508, threshold module 509, and DNS configuration module 510. Operating software 507 may further include an operating system, utilities, drivers, network interfaces, applications, or some other type of software. When executed by circuitry 505, operating software 507 directs processing system 503 to operate CN computing system 500 as described herein.

In particular, CN computing system 500 is used to provide cached data to one or more end user devices. To accomplish this task, computing system 500 may be assigned a plurality of IP addresses that are accessible using a corresponding plurality of ISPs. As a result, each of the ISPs may connect to computing system 500 using distinct IP addresses for the computing system.

As the end user devices connect to computing system 500, data structure module 508 is configured to identify performance or latency data for the user devices. This data may include the IP address for each connecting user device, the content delivery ISP that is connecting computing system 500, as well as performance or latency timing for providing content to the user devices. As the information is collected, threshold module 509 may be configured to identify that one or more of the connecting user devices exceed a latency threshold. In some examples, the one or more user devices that exceed the threshold may be from a similar range of device IP addresses. Accordingly, computing system 500 may determine that the range of IP addresses connect using the same user ISP.

Once the threshold is exceeded, DNS configuration module 510 is configured to adjust the communication path for the one or more identified user devices. For example, because computing system 500 determines that certain IP addresses are having issues with performance, computing system 500 may configure a DNS to direct the latency effected devices to the computing system using an alternative content delivery ISP. As a result, the end user device may connect to the same user ISP, but the path to computing system 500 will be different with the alternative content delivery ISP.

Although illustrated in the present example with three software modules, it should be understood that any number of software modules might be used to provide the path adjustment functions described herein.

Figure 6:
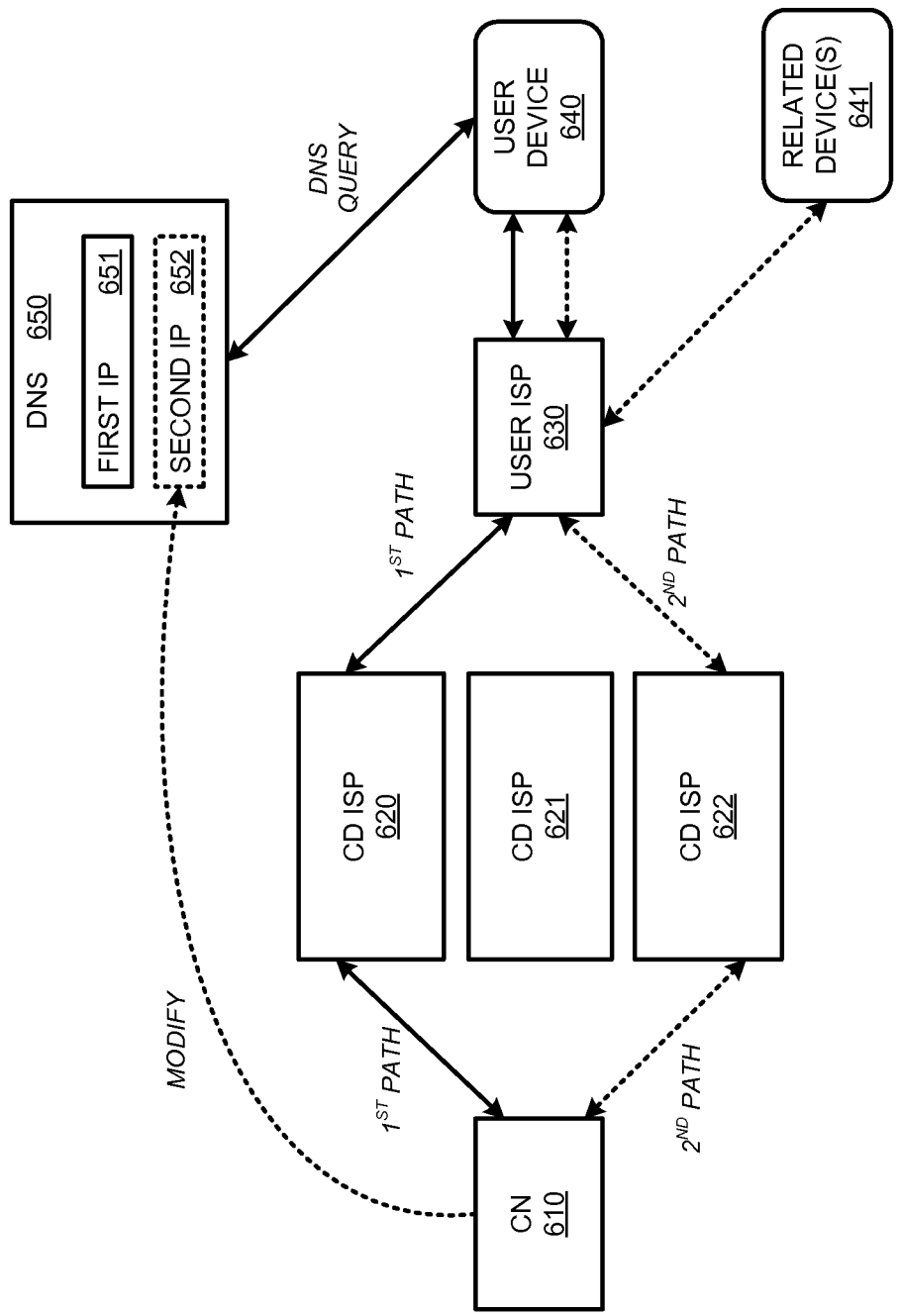
FIG. 6 is an overview illustrating the operation of a communication system.

Referring to FIG. 6, FIG. 6 illustrates an overview of operating a communication system according to one example. FIG. 6 includes CN 610, content delivery ISPs (620-622), user ISP 630, end user devices 640-641, and DNS 650.

In operation, DNS 650 is used to provide end user devices 640-641 with network IP addresses that allow the devices to communicate with external servers and systems. For example, if the user desired to visit a website, such as www.alpha.com, DNS 650 would associate the domain name of the site to the appropriate IP address. In the present instance, end user device 640 initiates a content request for content that is stored on CN 610. Responsive to the request, DNS 650 provides first IP address 651, which directs communications from end user device 640 across the network, including at least content delivery ISP 620 and user ISP 630, to CN 610. As content is provided to end user device 640, CN 610 maintains content delivery performance data for providing content to the end user devices. This delivery performance data may include the amount of time for a request to be received by CN 610, the amount of time for content to be requested and delivered to end user device 640, or any other similar performance metrics between CN 610 and end user device 640.

Based on the delivery performance information gathered about the communications, CN 610 may identify that one or more of the communicating devices meet a latency or performance condition, which may be predefined by an administrator, based on a relationship to other communications on CN 610, or any other threshold measurement. In the present example, CN 610 identifies that the performance data for end user device 640 has met a performance criteria for the communication. Accordingly, CN 610 modifies the DNS configuration at DNS 650 by including second IP address 652. Once the configuration is modified, future DNS requests by end user device 640 will direct the device to CN 610 using second IP address 652. In the present example, by changing to second IP address 652, the communication path from CN 610 to end user device 640 is modified to carry communications over content delivery ISP 622 rather than content delivery ISP 620. As a result, the new path intends to overcome possible obstacles that may have slowed performance or increased latency between the end user device and the CN by using the alternative ISP path.

Also illustrated in FIG. 6 is the second path transformation for related end user devices 641. CN 610 classifies these devices as similar to end user device 640 and, thus, the path for these devices is modified in the same way as end user device 640. In some examples, CN 610 may classify devices within a range of IP addresses as being effected by the performance or latency issues. As a result, when end user device 640 reaches the performance threshold, a range of IP addresses near the IP address for end user device 640 may also have their path redirected. In some examples, the range of IP addresses attempts to account for the range of devices that connect using user ISP 630, although the range of end user devices to be affected may connect using multiple user ISPs.

Figure 7:
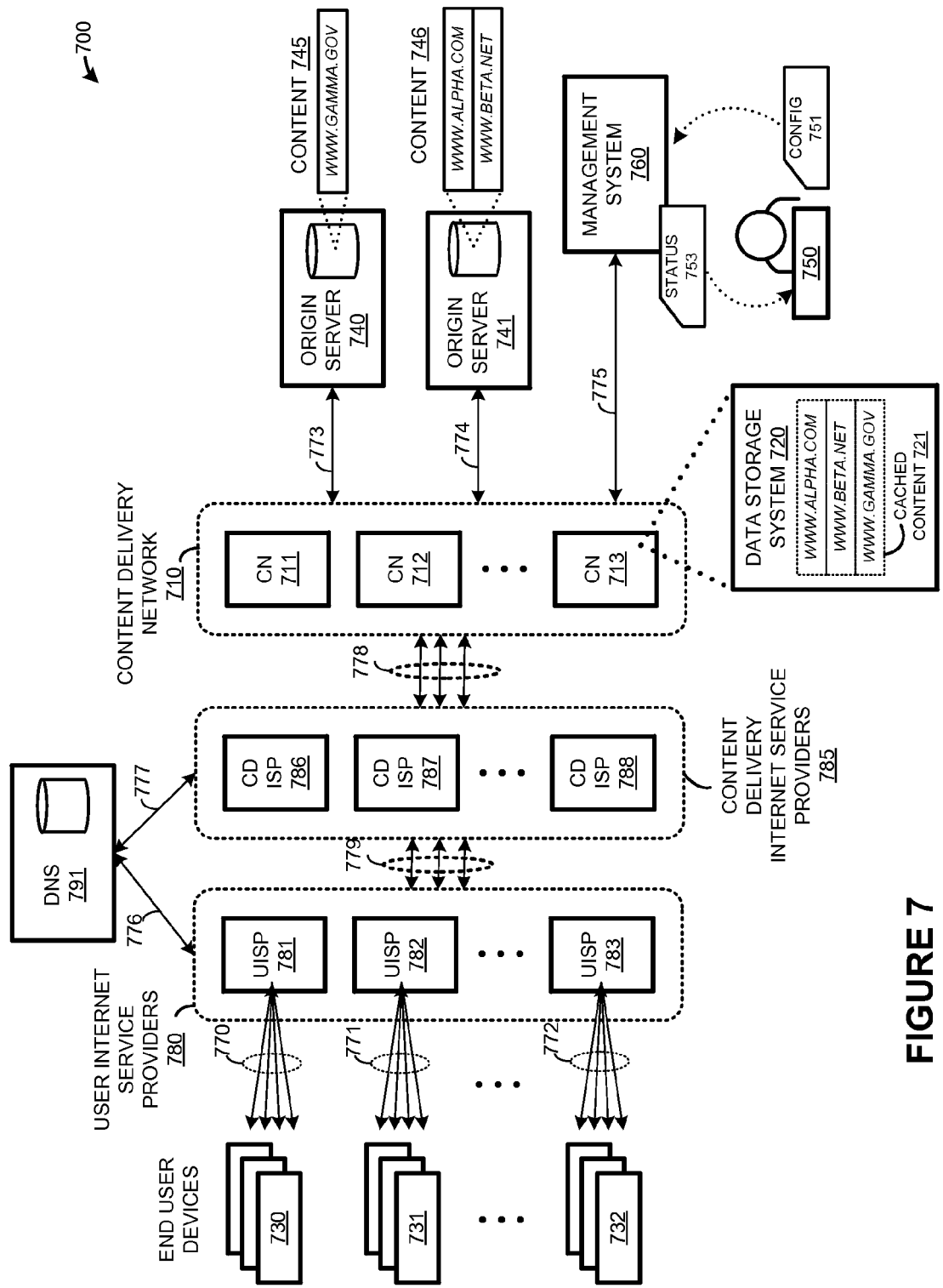
FIG. 7 is a system diagram illustrating a communication system.

Turning to FIG. 7, FIG. 7 illustrates a communication system 700 for selecting the communication path for end user devices. FIG. 7 illustrates a communication system 700 that allows changes in a communication path based on data latency. System 700 includes content delivery network 710, end user devices 730-732, origin servers 740-741, management system 760, DNS 791, user internet service providers (UISP) 781, and content delivery internet service providers (CDISP) 785. Each of CN 711-713 can include one or more data storage systems, such as that illustrated for CN 713 as data storage system 720. End user devices 730-732 are representative of a plurality of end user communication devices that can request and receive network content. It should be understood that any number of end user devices 730-732 could be associated with each of CNs 711-713. UISPs 781-783 and end user devices 730-732 communicate over associated network links 770-772. Content delivery network 710 and origin servers 740-741 communicate over associated network links 773-774. Content delivery network 710 and management system 760 communicate over link 775. DNS 791 communicates with UISPs 781-783 and CDISPs 785 over communication links 776-777. CDISPs 786-788 communicate with CNs 711-713 over communication links 778, and further communicate with UISPs 781-783 over communication links 779. Although illustrated in direct communication, it should be understood that UISPs 780 and CDISPs 785 might have one or more intermediary internet service providers.

To further illustrate FIG. 7, a brief description of the operation of communication system 700 is included. In operation, end user devices 730-732 request network content, such as content 745-746 associated with origin servers 740-741. Instead of these requests being handled by the individual origin servers 740-741, individual CNs 711-713 of content delivery network 710 receive the content requests and process the content requests for delivery of the content to the associated end user devices 730-732. Requested network content that is already stored in ones of CN 711-713 can be provided quickly to the end user devices, while network content that is not already stored in ones of CN 711-713 can be responsively requested by an associated one of CN 711-713 from an appropriate origin server 740-741 for delivery by the CN and possible caching by the CN. In this manner, each of CN 711-713 can act as intermediary proxy nodes to provide local and fast access for end user devices 730-732 to network content of origin servers 740-741 without burdening origin servers 740-741. FIG. 7 illustrates cached content 721 included in data storage system 720 of CN 713 as comprised of content 745-746, and thus content 745-746 is currently shown as cached by CN 713. Other configurations are possible, including subsets of content 745-746 being cached in individual ones of CN 711-713.

Although FIG. 7 shows content 745-746 of origin servers 740-741 being cached by data storage system 720, CN 711-713 can handle other content. For example, dynamic content generated by activities of end user devices 730-732 need not originally reside on origin servers 740-741, and can be generated due to scripting or code included in web page content delivered by CN 711-713. This dynamic content can also be cached by ones of CN 711-713, and can be specific to a particular end user device during a communication session.

DNS 791 is used to provide translations of domain names into IP addresses for user devices 730-732. In operation, when end user devices 730-732 require content from a domain name, user devices 730-732 will contact a DNS, such as DNS 791, to translate alphanumeric domain names to numerical network address. As demonstrated in FIG. 7, if one of user device 730-732 requires content from www.delta.com, DNS 791 will return the configured network address for the domain name. From this numerical address, a content request may be made to the appropriate CN 711-713 or other server.

In the present example, each of CN 711-713 may be accessed with multiple IP addresses that are used as addresses by CDISPs 786-788. For instance, CN 711 may be configured with one IP address for CDISP 786 and a completely different address for CDISP 788. Accordingly, there may be multiple CDISPs that can route data communications between end user devices 730-732 and CN 711.

Referring still to FIG. 7, management system 760 handles configuration changes and status information collection and delivery for system operators and for the origin server operators or managers. For example, operator device 750 can transfer configuration 751 for delivery to management system 760, where configuration 751 can alter the handling of network content requests by CN 711-713, among other operations. Also, management system 760 can monitor status information for the operation of CN 711-713, such as operational statistics, and provide this status information as 753 to operator device 750. Although one operator device 750 is shown in FIG. 7, it should be understood that this is merely representative and communication system 700 can include many operator devices for receiving status information or providing configuration information Referring to the elements of FIG. 7, CN 711-713, origin servers 740-741, management system 760, UISPs 781-783, CDISPs 786-788, and DNS 791 can each include communication interfaces, network interfaces, processing systems, computer systems, microprocessors, storage systems, storage media, or some other processing devices or software systems, and can be distributed among multiple devices.

End user devices 730-732 can include subscriber equipment, customer equipment, access terminal, smartphone, personal digital assistant (PDA), computer, tablet computing device, e-book, Internet appliance, media player, game console, or some other user communication apparatus, including combinations thereof. End user devices 730-732 are configured to communicate with CNs 711-713 over UISPs 781-783 and CDISP 786-788. Although the endpoint ISPs are illustrated in the present example, it should be understood that communication links 779 may comprise any number of ISPs to route communications between the user devices and the CNs.

Communication links 770-779 each use metal, glass, optical, air, space, or some other material as the transport media. Communication links 770-779 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 770-779 can each be a direct link, or can include intermediate networks, systems, or devices, and can include a logical network link transported over multiple physical links. Although one main link for each of links 770-779 is shown in FIG. 7, it should be understood that links 770-779 are merely illustrative to show communication modes or access pathways. In other examples, further links can be shown, with portions of the further links shared and used for different communication sessions or different content types, among other configurations. Communication links 770-779 can each include many different signals sharing the same associated link, as represented by the associated lines in FIG. 7, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a content node that caches content in a content delivery network to adjust a communication path between the content node and one or more end user devices, the method comprising:

Receiving a content request comprising a domain name from a first end user device of the one or more end user devices;

identifying latency data for a plurality of end user devices communicating with the content node;

determining, within the content node, that the one or more end user devices, in the plurality of end user devices, exceed a latency threshold when communicating with the content node through a first Content Delivery Internet Service Provider (CDISP), associated with a first Internet Protocol (IP) address for the content node, based on the latency data; and in response to determining that the one or more end user devices in the plurality of end user devices exceed the latency threshold, modifying the communication path between the content node and the one or more end user devices to utilize a second Content Delivery Internet Service Provider (CDISP), by modifying a domain name system (DNS) configuration for the content node, wherein the modifying comprises identifying a second Internet Protocol (IP) address for said content node, associated with the second Content Delivery Internet Service Provider (CDISP), to be provided to the first end user device; and delivering the requested content through the second Content Delivery Internet Service Provider (CDISP).

2. The method of claim 1 further comprising:

identifying one or more additional end user devices related to the one or more end user devices; and responsive to identifying the one or more additional end user devices, modifying a second communication path between the content node and the one or more additional end user devices by altering the DNS configuration for the content node.

3. The method of claim 2 wherein altering the DNS configuration for the content node comprises altering an Internet Protocol (IP) address provided to the one or more additional end user devices for the content node.

4. The method of claim 2 wherein identifying the one or more additional end user devices related to the one or more end user devices comprises identifying the one or more additional end user devices using the same Internet Service Provider as the one or more end user devices.

5. The method of claim 2 wherein the one or more end user devices and the one or more additional end user devices comprise end user devices within a range of IP addresses.

6. The method of claim 1 wherein the latency data comprises at least timing information for satisfying content requests.

7. The method of claim 6 wherein the latency threshold comprises a predefined latency time for satisfying content requests.

8. A computer apparatus to operate a content node that caches content in a content delivery network, the computer apparatus comprising:

processing instructions that direct the content node, when executed by the content node, to:

identify latency data for a plurality of end user devices communicating with the content node;

identify that one or more end user devices in the plurality of end user devices exceed a latency threshold when communicating with the content node through a first Content Delivery Internet Service Provider (CDISP), associated with a first Internet Protocol (IP) address for the content node, based on the latency data; and in response to identifying that the one or more end user devices in the plurality of end user devices exceed the latency threshold, modify a communication path between the content node and the one or more end user devices to utilize a second Content Delivery Internet Service Provider (CDISP), by modifying a domain name system (DNS) configuration, wherein the modifying comprises identifying a second Internet Protocol (IP) address for the content node, associated with the second Content Delivery Internet Service Provider (CDISP), to be provided to the one or more end user devices in response to a request for content comprising a domain name;

deliver the requested content through the second Content Delivery Internet Service Provider (CDISP); and one or more non-transitory computer readable media that store the processing instructions.

9. The computer apparatus of claim 8 wherein the processing instructions further direct the content node to:

identify one or more additional end user devices related to the one or more end user devices; and modify a second communication path between the content node and the one or more additional end user devices by altering the DNS configuration for the content node.

10. The computer apparatus of claim 9 wherein the processing instructions to modify the second communication path between the content node and the one or more additional end user devices by altering the DNS configuration for the content node direct the content node to modify the communication path between the content node and the one or more additional end user devices by altering an Internet Protocol (IP) address provided to the one or more additional end user devices for the content node.

11. The computer apparatus of claim 9 wherein the processing instructions to identify the one or more additional end user devices related to the one or more end user devices direct the content node to identify the one or more additional end user devices using the same Internet Service Provider as the one or more end user devices.

12. The computer apparatus of claim 9 wherein the one or more end user devices and the one or more additional end user devices comprise end user devices within a range of IP addresses.

13. The computer apparatus of claim 8 wherein the latency data comprises at least timing information for satisfying content requests.

14. The computer apparatus of claim 13 wherein the latency threshold comprises a predefined latency time for satisfying content requests.

* * * * *